United States Patent Office 3,502,100
Patented Mar. 24, 1970

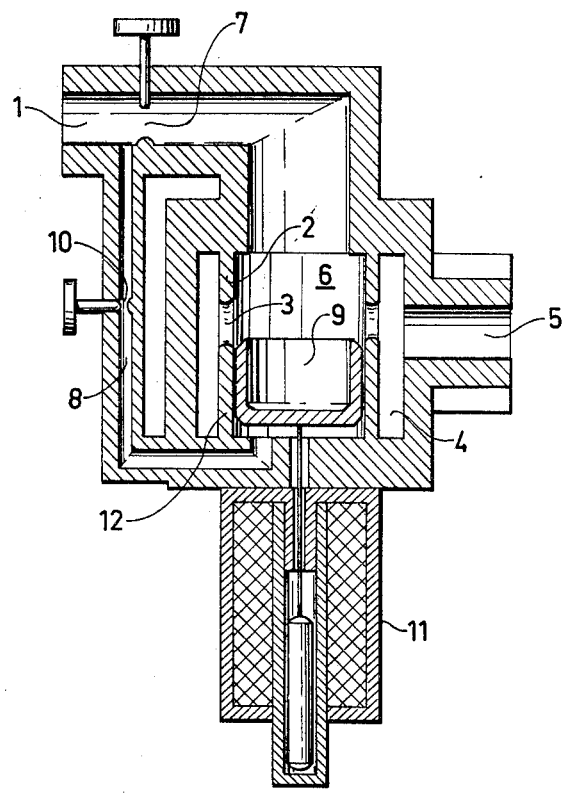

3,502,100
FLOW REGULATOR
Björn Lars Herman Jonson, Lomma, Sweden, assignor to Jarnhs Elektriska Aktiebolag, Stockholm-Solna, Sweden, a Swedish company
Filed Apr. 3, 1968, Ser. No. 718,413
Claims priority, application Sweden, Apr. 4, 1967, 4,636/67
Int. Cl. F16k 17/22, 31/163
U.S. Cl. 137—495
6 Claims

ABSTRACT OF THE DISCLOSURE

A flow regulator has between an inlet and an outlet for fluid to be regulated, a cylinder bore and a piston reciprocable therein and co-acting with openings in the peripheral wall of the cylinder bore, said inlet communicating with said outlet through these openings and the cylinder bore through one end thereof. Upstream of a restriction in the inlet there is provided a connection to the cylinder bore at the other end thereof to apply to the piston the differential pressure over such restriction, the piston thereby being adjusted relatively to said openings to regulate the flow therethrough in dependence of said differential pressure.

---

The present invention relates to a flow regulator for a pipe system through which a fluid, such as gas or liquid, will flow.

The main purpose of the apparatus is to control the volume flow of the fluid in order that it may remain at predetermined values irrespectively of the pressure in the inlet conduit in relation to the pressure in the outlet conduit as long as this pressure difference exceeds a certain low value. The apparatus may also serve as a valve for completely shutting off the flow.

Prior art apparatus for controlling the flow through a pipe system may be divided into four groups, viz the high impedance system, the servo system, the fluidistor and the control system. In the impedance system the fluid is exposed to a very high pressure and is allowed to flow through a high resistance. The pressure variations on the secondary side are small in relation to the high primary pressure and the flow will therefore remain essentially constant. Apparatus according to these principles are technically complicated and require that the fluid is exposed to a high pressure.

In the servo system an exterior power source is used, which actuates a restriction means and is controlled by a flow detector. Systems of this kind are technically complicated, in particular where demands are placed on speed and good damping of the servo function.

The fluidistors merely permit control of low primary pressures.

In the control system forces generated by the fluid flow control a restriction means in such a way that the flow will become constant. The object of the present invention relates to the latter system.

In prior art constructions according to this principle the fluid flows along and/or through a mobile component, hereinafter called float, which controls the fluid flow by more or less restricting an opening for the fluid, hereinafter called restriction. The float is adjusted through the action of forces generated by the fluid flow. In that case, however, no consideration has been given to the fact that the positional changes of the float will affect the geometry of the fluid flow path not only in the restriction. By changing the flow resistance along the float and as a result of the Bernouillie effect the forces controlling the position of the float and consequently the flow are affected and changed in such a way that the flow will not be kept constant, or will be kept constant only within a relatively narrow variation range of the pressure difference between the inlet and outlet of the apparatus. Furthermore, no prior art control means were suited for shutting off the flow completely.

In prior art control means an adjustment of the flow, if it was possible at all, implied a change of the fluid flow path in immediate connection with the float, which meant that the float and the adjustment means were constructionally connected with each other.

Furthermore, the movements of the float in the prior art means could not be damped in a simple manner mechanically, for which reason the number of movable parts increased, which entailed that the damping could not be controlled easily.

In prior art constructions the problems of the sealing between the float and the float housing entailed that part of the fluid flowed through the apparatus without passing the restriction, which entailed inexact control, in particular where the flow was insignificant and the pressures on the primary side were high.

In order to avoid these drawbacks in the flow regulator according to the present invention there is provided a flow regulator comprising a housing forming a cylinder bore, an inlet to said cylinder bore at one end thereof, and an outlet from said cylinder bore, the peripheral wall of said cylinder bore forming at least one opening near said one end, communicating with said outlet, a floating piston member guided for reciprocating movement in said cylinder bore and sealingly engaging the peripheral wall thereof, flow restricting means in said inlet and means connecting said inlet upstream of said flow restricting means with said cylinder bore at the other end thereof, said floating member thereby being actuated by said differential pressure to be maintained thereby in an adjusted position relatively to said opening.

The invention will be described in the following with reference to the appended drawing showing by way of example a cross-sectional view through a flow regulator embodied in accordance with the invention.

The fluid is supplied to the valve via an inlet conduit 1, which leads to the upper inlet in a vertical cylinder 6 having circular cross-section. The fluid flows on through perforations or openings 3 provided in the cylinder wall 2, which are two or more in number and spaced at even intervals from each other along the perimeter of the cylinder. The fluid flows out into an annular collecting chamber 4 and is discharged through the outlet 5 of the valve.

When the fluid passes from the inlet conduit 1 to the cylinder 6 it passes a controllable restriction 7, whereby a pressure difference arises between the inlet conduit 1 and the cylinder chamber 6. Through a pipe connection 8 between the inlet line 1 and a lower inlet in the cylinder the pressure in the inlet line 1 acts on the underside of a floating piston 9, which moves in the cylinder 2 with small friction and a good sealing thanks to a good fit and selection of a suitable material. This slide system, comprising the floating piston and the lower part of the cylinder, may preferably be made of ground glass. The pressure in the upper part of the cylinder 6 acts on the upper side of the piston.

If fluid having an increasing flow rate is supplied to the inlet conduit 1, the pressure difference between this conduit and the cylinder bore 6 will increase. When the pressure difference reaches a certain value depending on the setting of the restriction 7, the piston 9 is raised and the flow through the openings 3 is restricted to such a degree that the flow will be exactly of such a size that the pressure difference will balance the gravity of the piston 9 evenly whether or not the pressure in the inlet conduit 1 increases further.

In order to prevent the piston from being set in a swinging motion at rapid pressure variations in the system, the movement of the float must be damped to a critical value. According to the invention this is done by selecting a suitable resistance in the conduit 8, which resistance may possibly be controlled with a restriction means 10.

The flow may be interrupted completely by lifting the piston 9 in such a way that the openings 3 will be shut completely. This may for instance be done by letting an electromagnet 11 lift the piston 9 from below to an upper position, in which it will close all openings 3 in the cylinder wall 2.

According to a further characteristic of the invention, the floating piston may be caused to control the flow through the regulator by means of an exterior member, e.g. the said electromagnet, together with the pressure variations in the regulator inlet. Thus, the piston may be actuated with a force which together with the gravity causes the piston to occupy another position for changing the fluid volume flowing through the regulator. Furthermore, the piston may be adapted to be actuated by the exterior member in a manner variable with the time so that a flow varying in a determined manner will be obtained. Such a control of the flow merely requires an insignificant quantity of energy.

What I claim and desire to secure by Letters Patent is:

1. A flow regulator comprising a housing forming a cylinder bore, an inlet to said cylinder bore at one end thereof, and an outlet from said cylinder bore, the peripheral wall of said cylinder bore forming at least one opening near said one end, communicating with said outlet, a floating piston member guided for reciprocating movement in said cylinder bore and sealingly engaging the peripheral wall thereof, flow restricting means in said inlet, and means connecting said inlet upstream of said flow restricting means with said cylinder bore at the other end thereof, said floating member thereby being actuated by said differential pressure to be maintained thereby in an adjusted position relatively to said opening.

2. A flow regulator as claimed in claim 1 further comprising means in said connecting means to regulate the through area thereof.

3. A flow regulator as claimed in claim 1 in which said housing forms an annular chamber surrounding said cylinder bore, said cylinder bore communicating with said outlet through said opening via said annular chamber.

4. A flow regulator as claimed in claim 1 in which said floating piston member and parts of said housing, forming at least part of the peripheral wall of said cylinder bore are made of glass material, the interengaging surfaces of said piston member and said parts being ground.

5. A flow regulator as claimed in claim 1 further comprising means to positively move said floating piston members towards said one end of said cylinder bore to close said openings.

6. A flow regulator as claimed in claim 5 in which the axis of said cylinder bore is substantially vertical, said one end being the upper end and said other end being the lower end, said actuating means counter-acting gravity forces acting on said piston member.

References Cited
UNITED STATES PATENTS

| | | | |
|---|---|---|---|
| 1,741,489 | 12/1929 | Watts | 137—501 XR |
| 2,990,847 | 7/1961 | Absalom | 137—501 XR |
| 3,223,115 | 12/1965 | Kates | 137—501 |

M. CARY NELSON, Primary Examiner

R. J. MILLER, Assistant Examiner

U.S. Cl. X.R.

137—501; 251—368